(12) United States Patent
Aoki

(10) Patent No.: US 6,301,588 B1
(45) Date of Patent: Oct. 9, 2001

(54) SIGNAL PROCESSING METHOD

(75) Inventor: Shinji Aoki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/595,941

(22) Filed: Feb. 6, 1996

Related U.S. Application Data

(63) Continuation of application No. 08/266,493, filed on Jun. 27, 1994, now abandoned.

(30) Foreign Application Priority Data

Jun. 30, 1993 (JP) ................................................ 5-161816

(51) Int. Cl.⁷ ...................................................... G06F 17/30
(52) U.S. Cl. ........................... 707/200; 707/101; 360/72.1
(58) Field of Search ..................................... 707/100, 101, 707/200, 201, 205; 360/5, 48, 72.1, 72.2, 72.3, 134, 149

(56) References Cited

U.S. PATENT DOCUMENTS

| 4,652,940 | * | 3/1987 | Sumiyoshi | 360/5 |
| 5,325,370 | * | 6/1994 | Cleveland et al. | 371/37.4 |
| 5,388,016 | * | 2/1995 | Kanai et al. | 360/72.1 |

* cited by examiner

Primary Examiner—Hosain T. Alam
(74) Attorney, Agent, or Firm—Frommer Lawrence & Haug LLP.; William S. Frommer

(57) ABSTRACT

A signal processing method can record latest management information of high reliability on a tape in a short period of time. A directory information table (DIT) for recording management information of at least a last file is provided behind the last file. Management information is recorded immediately after a new file to be added on the tape by supplying data to a magnetic recording apparatus.

2 Claims, 7 Drawing Sheets

FIG. 1
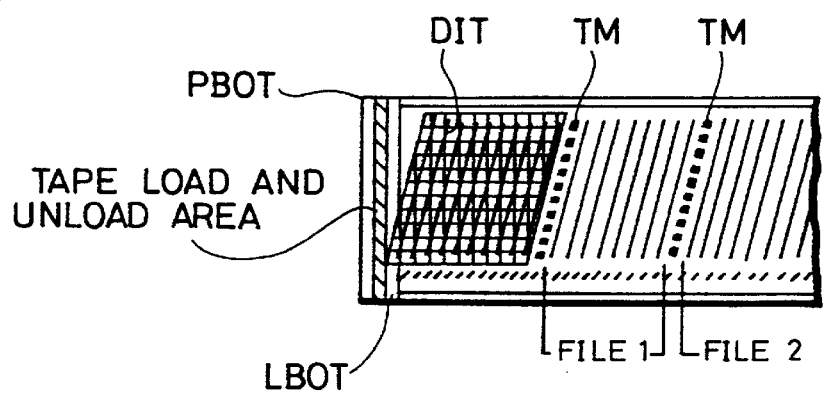
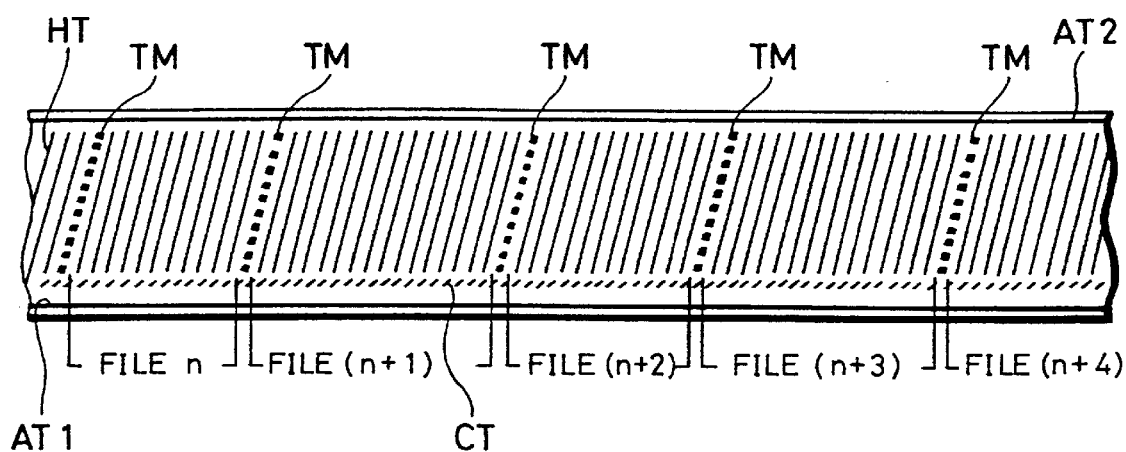
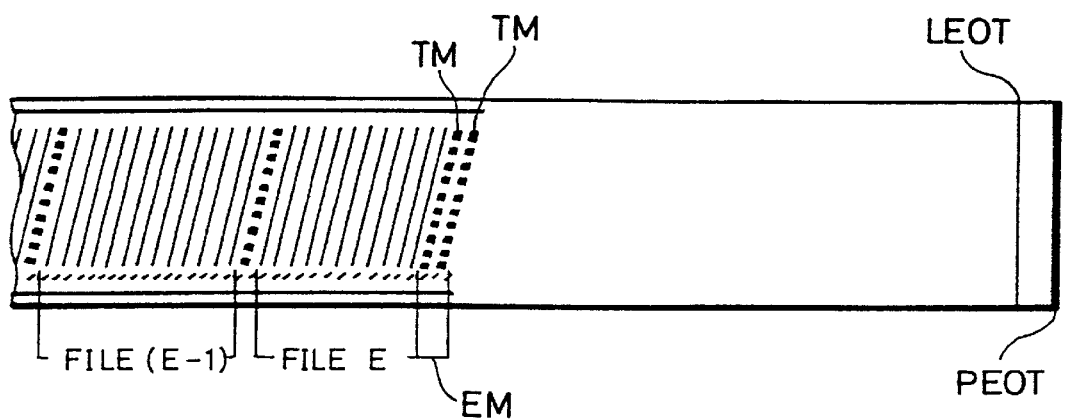

FIG. 5
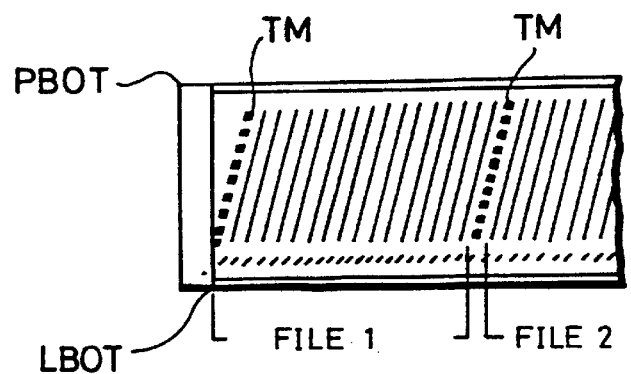
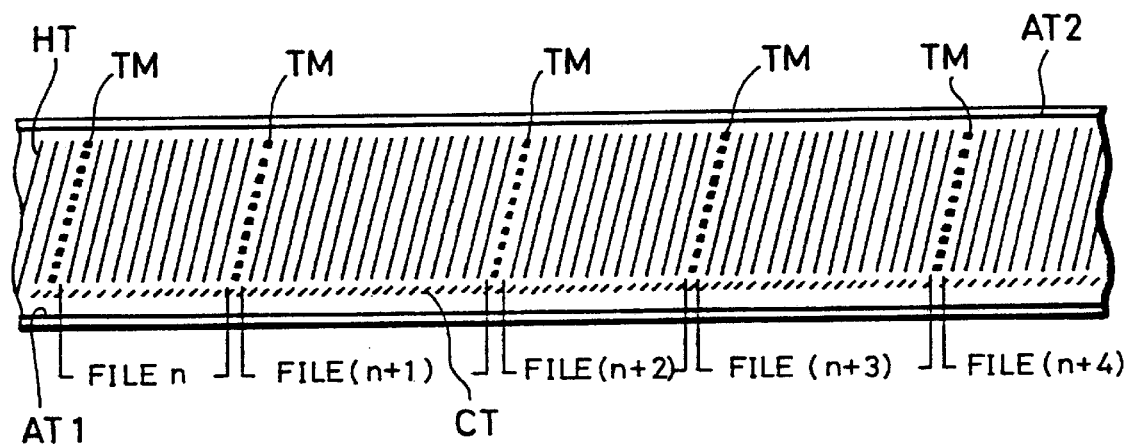
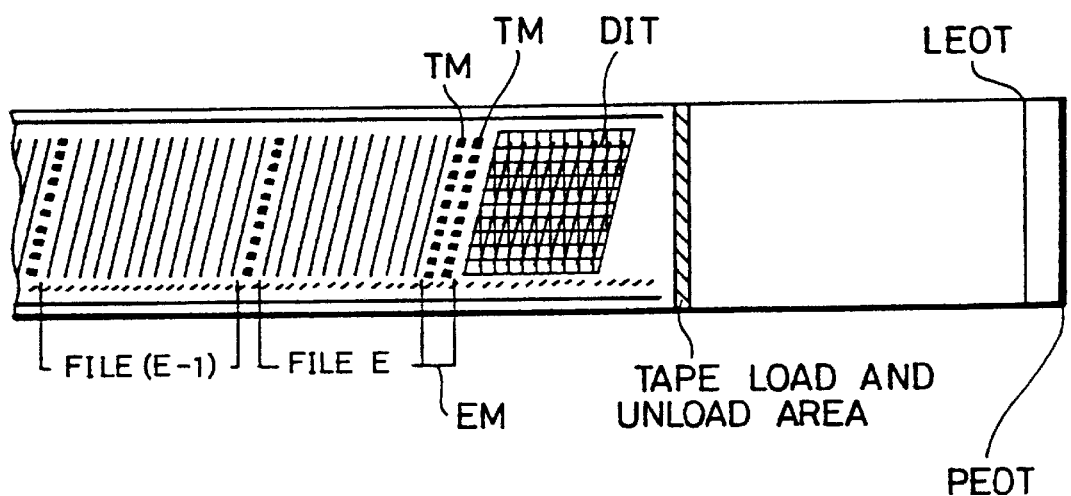

FIG. 6
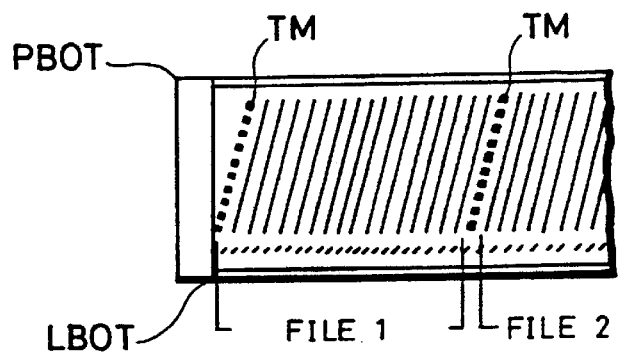
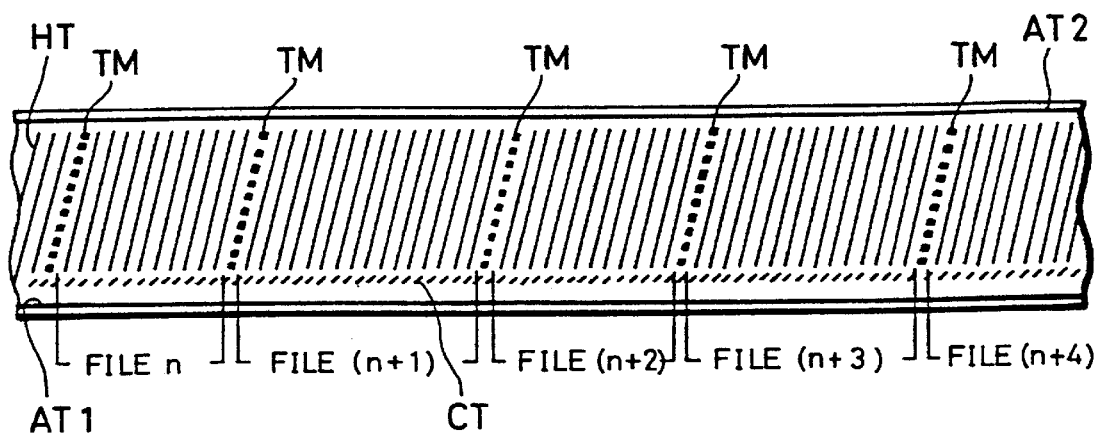
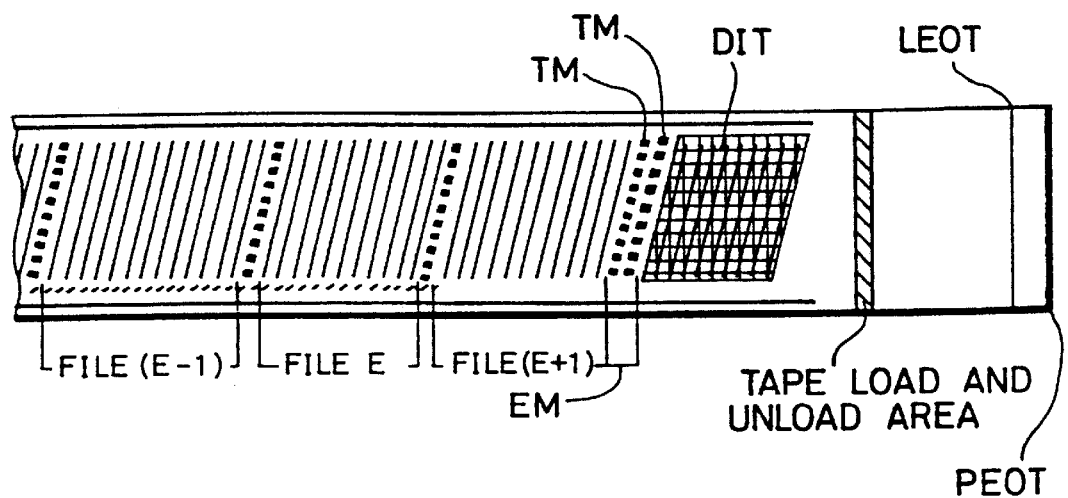

FIG. 7
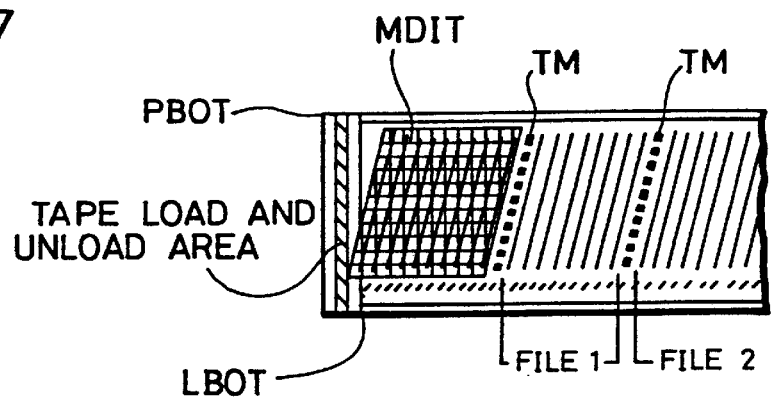
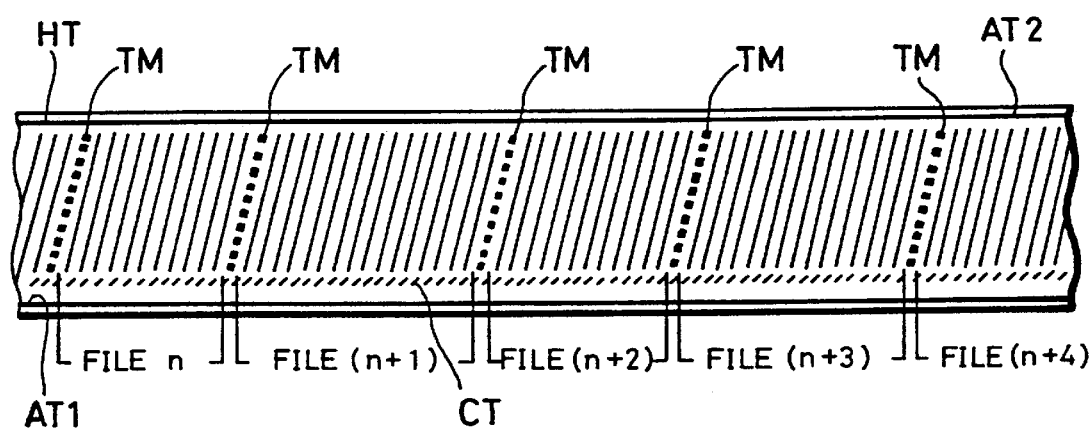
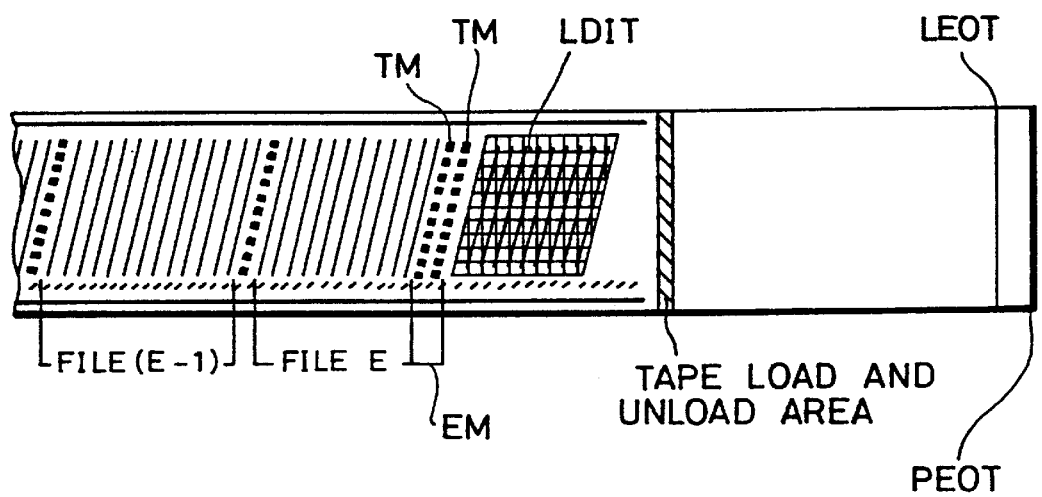

SIGNAL PROCESSING METHOD

This application is a continuation of application Ser. No. 08/266,493, filed Jun. 27, 1994 now abandoned.

BACKGROUND OF THE INVENTION

The present invention relates to a signal processing method for use with a data recorder, for example.

When data supplied from a host apparatus, such as a host computer or the like, is recorded on and reproduced from a magnetic recording apparatus, such as a data recorder or the like, there has hitherto been used a signal processing apparatus in which data that had been converted in accordance with a predetermined logical format is recorded on the magnetic recording apparatus upon recording and data that had been reproduced from the magnetic recording apparatus is reconverted into original data in accordance with the predetermined logical format upon reproduction.

A recording apparatus using a magnetic tape is used as a computer peripheral equipment. Having been compared with a direct access device such as a magnetic disc in which data at an arbitrary position can be accessed randomly, a magnetic tape is what might be called a sequential access device because data recorded therein is accessed sequentially.

A sequential access device of the computer systems implements a file formatting on the tape to thereby form a tape mark for segmenting files and an end mark by recording consecutive two tape marks after the last file. Moreover, a directory information table (DIT) which comprises address data indicating the position of the tape mark on the tape, volume management information for managing a tape medium itself, such as a tape reel, a tape cassette or the like and update information are recorded on the tape.

FIG. 1 of the accompanying drawings shows a physical beginning of tape position PBOT, a logical beginning of tape position LBOT, a physical end of tape position PEOT and a logical end of tape position LEOT which will be referred to hereinafter simply as "position PBOT", "position LBOT", "position PEOT" and "position LEOT", respectively.

As shown in FIG. 1, in addition to a helical track HT where file data, the directory information table DIT and tape marks TM are recorded, there are a control track CT on which servo information and address information are recorded by a stationary head in the longitudinal direction of the tape and annotation tracks AT1, AT2 on which memo information or the like is recorded by a stationary head in the longitudinal direction of the tape. The track formed in the longitudinal direction is used for recording area for audio time code when the tape is used as a medium for recording a video signal.

As shown in FIG. 2, on the helical track HT are recorded file X as file data, the directory information table DIT and the tape marks TM. Further, on the helical track HT is recorded sub code SC in which track attribute data serving as information to discriminate the type of track is coded.

As shown in FIG. 3, the sub code SC of a directory information table track DITT has a value of "AAA", the sub code SC of a tape mark track TMT has a value of "BBB", the sub code SC of a user data track UDT has a value of "CCC", and the sub code SC of a dummy track DT has a value of "DDD".

The user data track UDT is a track in which user data is recorded in the file as valid data in actual practice. The dummy track DT is a track in which useless data that had been entered because of the device circumstance is recorded as invalid data.

When the tape that is used as the sequential device of the computer system is unloaded from the driver, in order to protect the tape from being damaged, the tape is not unloaded from the driver until the tape is rewound to the position PBOT. Also, when the tape is loaded on the driver, data is not written in or read out from the tape until the tape is rewound to the position PBOT.

Accordingly, the directory information table DIT in which the address data indicating the position of the tape mark on the tape, the volume management information for managing the data of the tape medium itself, such as tape reel, tape cassette or the like and the update information are recorded is provided at the tape top, i.e., at the position substantially next to the position LBOT.

However, if a file is sequentially made, then the above-mentioned signal processing method records the directory information table DIT as the updated management information each time the file is made. Therefore, the tape should be rewound to the position PBOT in order to record the directory information table DIT, which unavoidably needs a lot of time. Furthermore, the magnetic tape is very frequently traveled near the tape position in which the directory information table DIT is recorded. There is then the disadvantage that the tape itself tends to be damaged.

To solve this problem, the updated directory information table DIT is temporarily stored in some suitable means, such as a semiconductor memory or the like, and the directory information table DIT that had been stored in the semiconductor memory is transferred to the tape after the tape was rewound to the position PBOT immediately before the tape is changed. This method also causes the following problem. That is, the memorized content of the semiconductor memory is erased when a power supply is disabled so that the preserved state of the directory information table DIT becomes unstable as compared with the tape.

Although a nonvolatile memory is considered as means for preventing the memorized content of the memory from being erased when an electricity failure occurs, the nonvolatile memory is limited in number to write therein data and is not practical in use for this reason. Furthermore, when the power supply is disabled to erase the directory information table DIT before the updated directory information table DIT is transferred to the tape, the files should sequentially be read out from the position PBOT to the last file of the tape and the directory information table DIT should be reconfigured. There is then the disadvantage that the signal processing becomes complex and needs plenty of time.

SUMMARY OF THE INVENTION

In view of the aforesaid aspect, it is an object of the present invention to provide a signal processing method in which latest management information can be recorded on a tape in a short period of time.

According to an aspect of the present invention, there is provided a signal processing method which comprises the steps of making files sequentially from data supplied from a data supplying side on the basis of a predetermined format, providing management information recording portion for recording management information of at least a last file behind the last file, and supplying data to a magnetic recording side.

In accordance with another aspect of the present invention, there is provided a signal processing method which comprises the steps of making files sequentially from data supplied from a data supplying side on the basis of a predetermined format, providing management information for recording management information of at least a last file behind the last file, and supplying data to the magnetic recording side.

BRIEF DESCRIPTION OF THE DRAWINGS

FIGS. 1 to 3 are diagrams used to explain an action of a signal processing method;

FIGS. 5 to 7 are diagrams used to explain an action of the signal processing method according to the embodiment of the present invention.

DETAILED DESCRIPTION OF THE PREFERRED EMBODIMENT

A signal processing method according to an embodiment of the present invention will hereinafter be described with reference to FIGS. 4 through 7.

Figure 4:
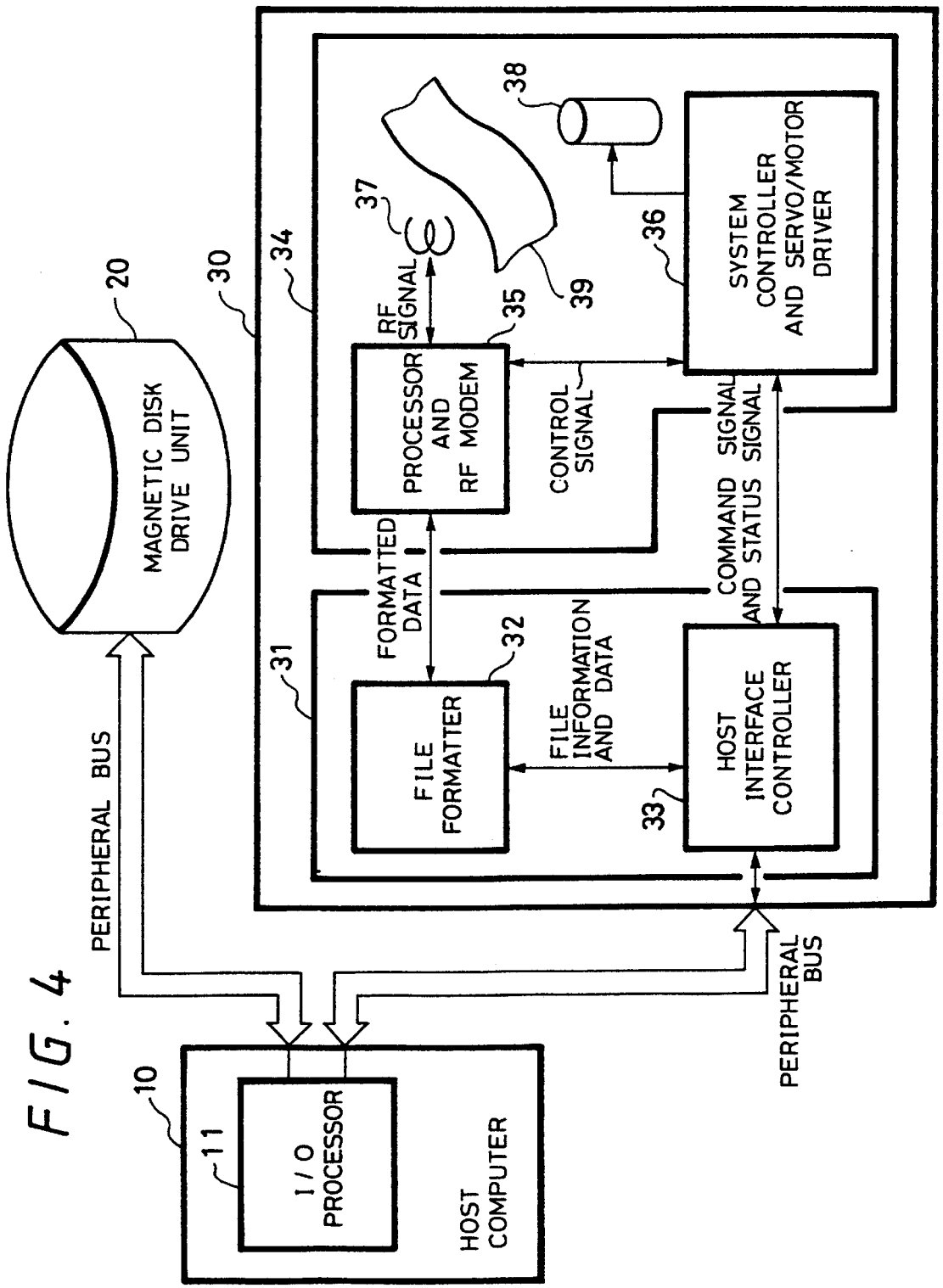
FIG. 4 is a block diagram showing an arrangement of a signal processing apparatus to which a signal processing method according to an embodiment of the present invention is applied.

FIG. 4 is a block diagram showing an arrangement of a signal processing apparatus to which the signal processing method according to the present invention is applied. This signal processing apparatus is disposed between the host computer serving as the host device and the magnetic recording apparatus serving as a low-order apparatus, such as the data recorder, and converts data transferred thereto from the host computer into data of the DD-1 format which is the magnetic recording format standardized by the ANSI (American national standards institute).

The signal processing apparatus adds padding data, sub code and an error-correction code to data according to the DD-1 format and controls the data recorder.

The signal processing apparatus is composed of a computer system shown in FIG. 4. As shown in FIG. 4, a host computer 10 exchanges file data among it and a magnetic disc drive unit 20 of the direct access device and a magnetic tape drive unit 30 of the sequential access device through peripheral buses.

To be more concrete, when the file data is exchanged between the host computer 10 and the magnetic tape drive unit 30 of the sequential access device, an I/O processor 11 supplies data to a host interface controller 33 on the basis of a command signal and a status signal.

When data is written, for example, the host computer 10 selects the magnetic tape drive unit 30 of the sequential access device and issues a write command for writing data to the magnetic tape drive unit 30 so as to send data to the magnetic tape drive unit 30.

The host interface controller 33 of a signal processing apparatus 31 receives the write command and sends data supplied thereto from the host computer 10 to a file formatter 32. The file formatter 32 file-formats data supplied thereto in accordance with a predetermined format and supplies the data thus formatted to a processor and RF MODEM (modulator and demodulator) 35 of a magnetic recording apparatus 34. The processor and RF MODEM 35 effects the processing and the RF modulation on the data supplied thereto so that the data may be recorded on a magnetic tape 39.

The data thus processed is recorded on the magnetic tape 39 by supplying the RF signal to a magnetic head 37 on the basis of the control signal from a system controller and servo/motor driver 36. The processor and RF MODEM 35 supplies the system controller and servo/motor driver 36 with a drive control signal that results from interpreting the write command.

The system controller and servo/motor driver 36 controls the recording system and a motor 38 in accordance with the drive control signal supplied thereto.

When data is reproduced, the host computer 10 selects the magnetic tape drive unit 30 of the sequential access device and issues a read command for reading data to the magnetic tape drive unit 30. The host interface controller 33 of the signal processing apparatus 31 receives this read command and supplies the system controller and servo/motor driver 36 with a drive command that results from interpreting the read command.

The system controller and servo/motor driver 36 controls the motor 38 and the recording system in accordance with the drive command supplied thereto. Then, the magnetic head 37 reads data on the magnetic tape 39 as an RF signal, and the processor and RF MODEM 35 and the file formatter 32 process data and supply data thus processed to the host computer 10 through the host interface controller 33.

Incidentally, the file formatter 32 reconverts the data file formatting, and the processor and RF MODEM 35 performs the RF demodulation and reconverts the processing for recording data on the tape.

The file formatter 32 carries out the processing concerning the file, such as to generate and interpret track data and sub code of the directory information table DIT, the tape mark TM and the dummy track DT.

FIG. 5 shows the physical beginning of tape position PBOT, the logical beginning of tape position LBOT, the physical end of tape position PEOT and the logical end of tape position LEOT which will be referred to hereinafter simply as "position PBOT", "position LBOT", "position PEOT" and "position LEOT", respectively, similarly as described before with reference to FIG. 1.

As shown in FIG. 5, in addition to the helical track HT where the file data, the directory information table DIT and the tape marks TM are recorded, there are the control track CT on which servo information and address information are recorded by a stationary head in the longitudinal direction of the tape and the annotation tracks AT1, AT2 on which memo information or the like is recorded by a stationary head in the longitudinal direction of the tape similarly as described before with reference to FIG. 1. Also, the track formed in the longitudinal direction is used for recording area for audio time code when the tape is used as a medium for recording a video signal.

On the helical track HT are recorded the file X as file data, the directory information table DIT and the tape marks TM. Further, on the helical track HT is recorded the sub code SC in which track attribute data serving as information to discriminate the type of track is coded.

Figure 2:
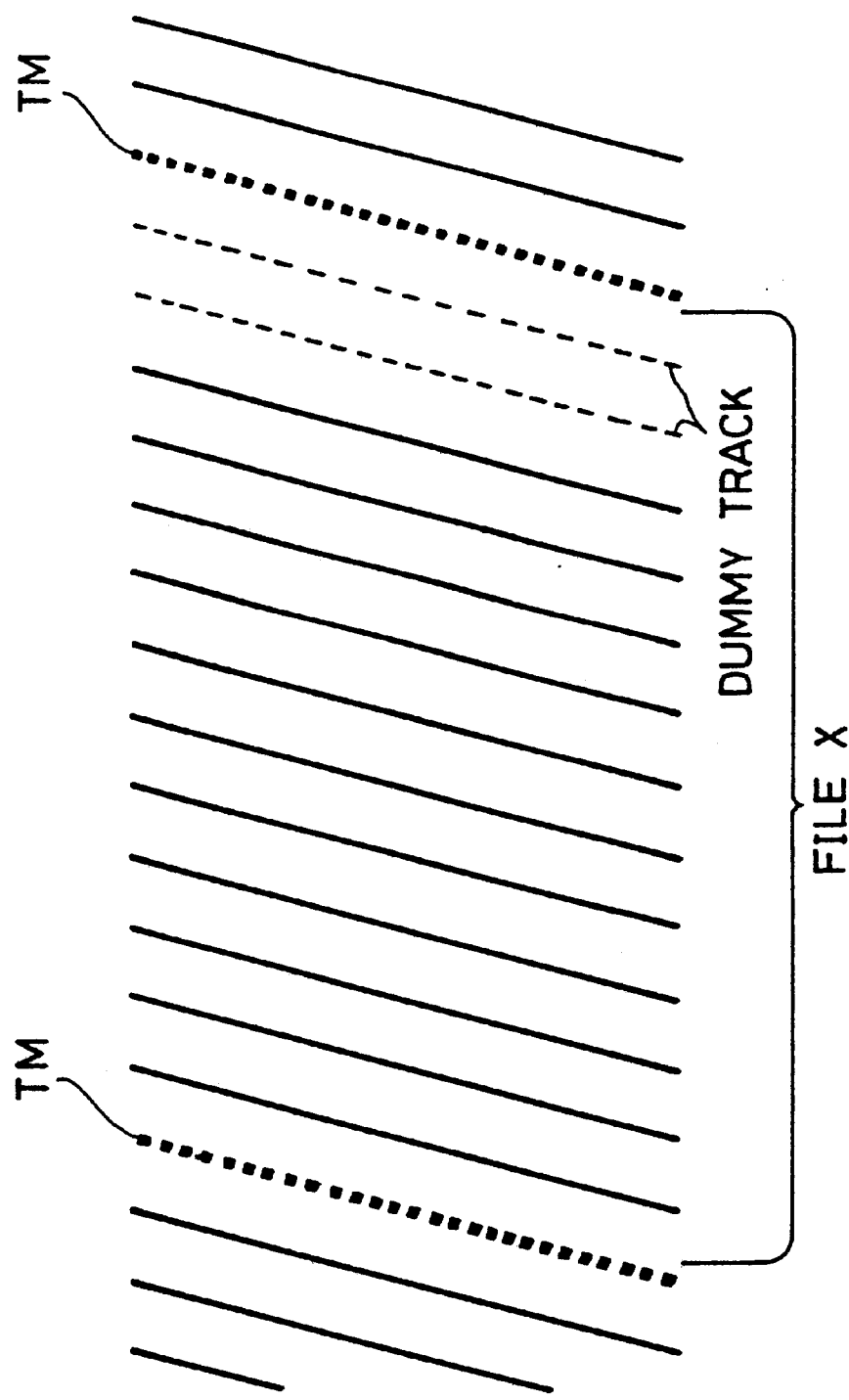
Figure 3:
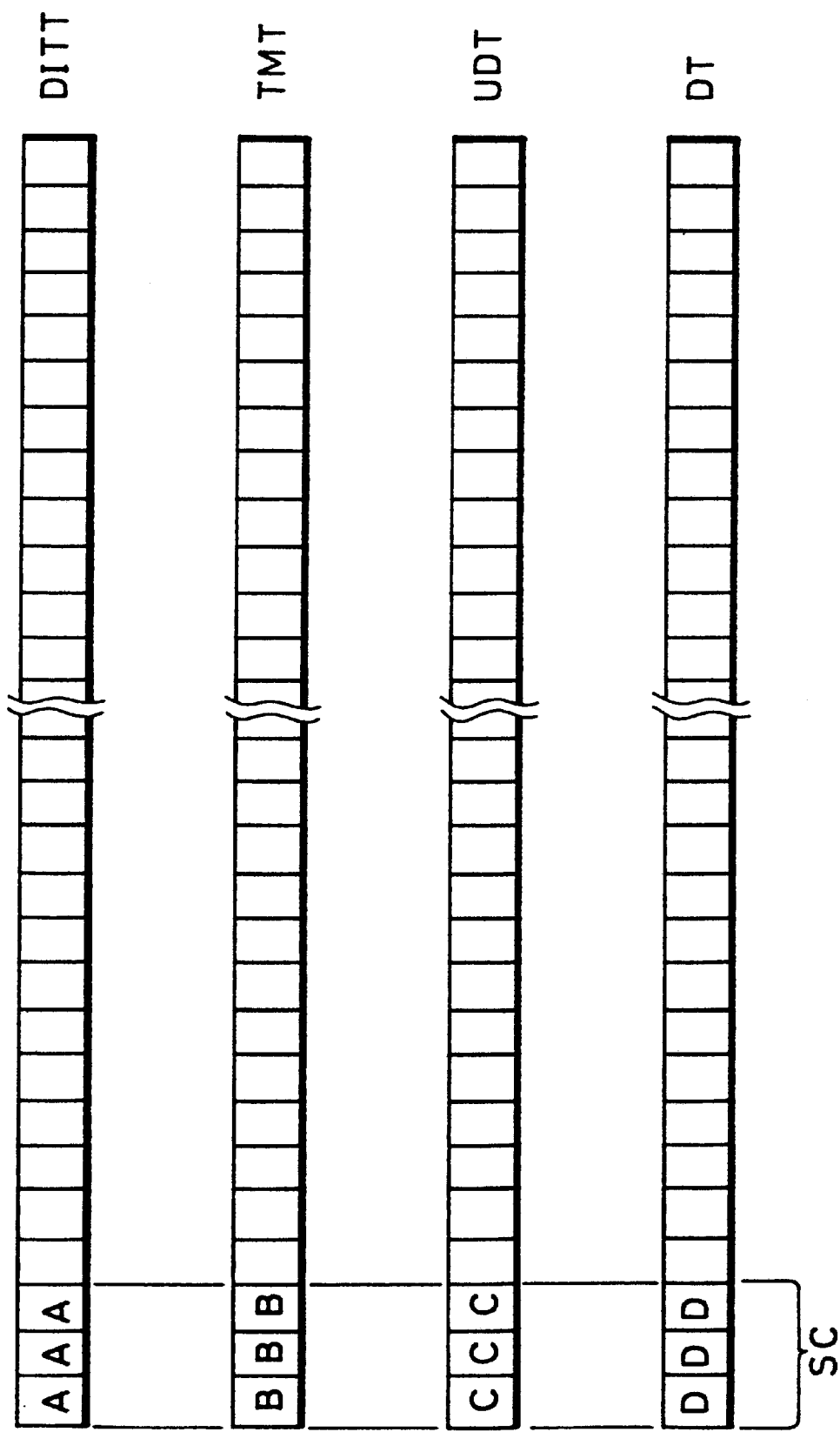

Similarly, as earlier noted with reference to FIG. 3, the sub code SC of the directory information table track DITT has a value of "AAA", the sub code SC of the tape mark track TMT has a value of "BBB", the sub code SC of the user data track UDT has a value of "CCC", and the sub code SC of the dummy track DT has a value of "DDD".

The user data track UDT is a track in which user data is recorded as valid data in actual practice, and the dummy track DT is a track in which useless data entered because of the device circumstance is recorded as invalid data.

Files from file 1 to file E are sequentially formed in accordance with the data supplied from the host computer 10 and the end mark EM is formed by providing the two consecutive tape marks TM. The directory information table DIT is provided just behind the end mark EM. Further, the tape load and unload area is provided behind the directory information table DIT.

Therefore, upon recording, since a new file is overwritten by transporting the tape from the tape load and tape unload area to the starting portion of the directory information table DIT and the updated directory information table DIT is formed behind the last file, it is possible to minimize the tape transport amount. Upon reproduction, since file management information can be obtained by transporting the tape from the tape load and unload area to the directory information table DIT, it is possible to minimize the tape transport amount similarly.

When a file (E+1) is made next to the file E, as shown in FIG. 6, the file (E+1) is overwritten so as to erase the directory information table DIT provided behind the file E and the updated directory information table DIT is provided after the file (E+1).

Further, as shown in FIG. 7, a master directory information table MDIT is provided ahead of the file 1 and a local directory information table LDIT is provided behind the latest file E. The local directory information table LDIT is sequentially updated each time a new file is made. The master directory information table MDIT may record thereon the content of the local directory information table LDIT when the tape is unloaded after the recording in the magnetic recording apparatus 34 is completed.

According to the embodiment of the present invention, since the directory information table DIT for recording thereon at least the latest file management information is provided behind the last file to supply data to the magnetic recording apparatus 34, management information can be recorded on the tape at its position immediately after a file newly added. Therefore, the management information need not be stored in the semiconductor memory whose memorized content is unstable as compared with the tape. Thus, the magnetic recording apparatus 34 can record management information of high reliability. Furthermore, when a new file is additionally made after the tape is loaded one more time, the tape need not be transported from the tape top to the position of the last file and the new file is recorded following the last file or the directory information table DIT. Therefore, the new file is recorded only by transporting the tape in the shortest distance and the number of tape transport can be reduced.

According to the present invention, since the data is supplied to the magnetic recording apparatus 34 by providing the master directory information table MDIT in which all management informations of respective files are recorded at a predetermined time after data was recorded by the magnetic recording apparatus 34 ahead of the first file and the local directory information table LDIT in which management information of at least the last file is recorded behind the last file, when the tape is changed after data was recorded by the magnetic recording apparatus 34, it is possible to obtain management information of high reliability by recording the management information of the local directory information table LDIT on the master directory information table MDIT.

According to the present invention, since the directory information table DIT is updated for each of the files sequentially made, when the tape is changed in the magnetic recording apparatus, the tape can be changed only by slightly moving the tape to the non-recording position behind the updated management information and the tape need not be rewound, thereby making it possible to change the tape in a short period of time. Further, since a new file is recorded following the last file when a new file is additionally made, the new file can be recorded only by transporting the tape in the shortest distance, thereby making it possible to reduce the number of the tape travel.

According to the present invention, since the local directory information table LDIT is updated for each of the files sequentially made, when the tape is changed after data is recorded by the magnetic recording apparatus 34, the management information of the latest local directory information table LDIT can be recorded on the master directory information table MDIT.

Further, the directory information table DIT or the local directory information table LDIT may be provided after each file, respectively. If the directory information table DIT or the local directory information table LDIT is provided behind each file, it is possible to obtain management information of every file in a corresponding fashion.

Furthermore, the local directory information LDIT may be provided after each file and the local directory information table LDIT may be provided as a difference between it and each of the files sequentially made. With this arrangement, overlapping management information can be prevented from being left and the capacity of the local directory information table LDIT can be minimized.

According to the present invention, since the management information recording portion for recording management information of at least a last file is provided behind the last file and data is supplied to the magnetic recording side, management information can be recorded immediately after a new added file on the tape and management information need not be stored in a semiconductor memory whose stored state is unstable as compared with the tape, thereby making it possible to supply management information of high reliability to the magnetic recording side. Further, since a new file is recorded behind the last file or the management information recording portion without transporting the tape from the tape top to the position of the last file when a new file is additionally made after the tape is loaded one more time, the new file can be recorded only by transporting the tape in the shortest distance and therefore the number of tape running can be reduced.

According to the present invention, since a management information recording portion for recording management information of at least a last file is provided behind the last file, a master management information recording portion for recording all management informations of respective files at a predetermined timing point after data was recorded by the magnetic recording side is provided ahead of the first file and data is supplied to the magnetic recording side, when a tape is changed after data was recorded by the magnetic recording side, it is possible to obtain management information of high reliability by recording the management information of the management information recording portion in the master management information recording portion.

According to the present invention, since the management information recording portion is updated for respective files sequentially made, when the tape is changed in the magnetic recording side, it becomes possible to change the tape only by slightly transporting the tape to a non-recording position which is behind an updated management information. Therefore, the tape need not be rewound and the tape can be changed in a short period of time. Further, when the new file is additionally made, the new file is recorded next to the last file and the new file can be recorded only by transporting the tape in the shortest distance. Thus, it is possible to reduce the number of the tape travel.

Further, according to the present invention, since the management information recording portions are respectively provided behind the files, it is possible to obtain the management information in a corresponding relation to every file.

Furthermore, according to the present invention, since the management information recording portions are respectively provided behind the respective files and the management information recording portion makes only a difference between it and each of the files sequentially formed, overlapping management information can be prevented from being left and therefore the capacity of the management information recording portion can be minimized.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A signal processing method for recording data onto a magnetic tape, said method comprising the steps of:

sequentially recording a plurality of files onto said magnetic tape, wherein each of said plurality of files, except for the first file recorded on said magnetic tape, is recorded over a previously recorded local directory information table;

recording a new local directory information table at a position on said magnetic tape located after the last file of said plurality of files, said new local directory information table comprising undated management information corresponding to at least the last file of said plurality of files; and recording, after the recording of all of said plurality of files, a master directory information table at a second predetermined position on said magnetic tape, said master directory information table comprising management information corresponding to all of said plurality of files.

2. The method according to claim 4, wherein said second predetermined position is located before the first file of said plurality of files.

\* \* \* \* \*